United States Patent
Lee et al.

(10) Patent No.: US 12,450,775 B2
(45) Date of Patent: Oct. 21, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Jung Hyun Lee, Seoul (KR); Sam Yong Kim, Hwaseong-si (KR); Donghoon Koo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 259 days.

(21) Appl. No.: 18/144,602

(22) Filed: May 8, 2023

(65) Prior Publication Data
US 2023/0368424 A1 Nov. 16, 2023

(30) Foreign Application Priority Data
May 11, 2022 (KR) .................. 10-2022-0057967

(51) Int. Cl.
*G06T 7/80* (2017.01)
*G06V 20/56* (2022.01)
*H04N 23/90* (2023.01)

(52) U.S. Cl.
CPC .............. *G06T 7/80* (2017.01); *G06V 20/588* (2022.01); *H04N 23/90* (2023.01); *G06T 2207/30204* (2013.01); *G06T 2207/30244* (2013.01); *G06T 2207/30256* (2013.01)

(58) Field of Classification Search
CPC .... G06T 7/70; G06T 7/73; G06T 7/80; G06T 7/85; G06T 2207/30204; G06T 2207/30244; G06T 2207/30256; H04N 23/90; G06V 20/588
See application file for complete search history.

(56) References Cited

U.S. PATENT DOCUMENTS

| | | | |
|---|---|---|---|
| 9,201,424 B1* | 12/2015 | Ogale | G05D 1/0253 |
| 12,254,647 B2* | 3/2025 | Ruppel | G06T 7/70 |
| 2015/0120153 A1* | 4/2015 | Heim | G06V 20/588 |
| | | | 382/103 |
| 2015/0222813 A1* | 8/2015 | Okude | G01C 21/3602 |
| | | | 701/523 |
| 2017/0061622 A1* | 3/2017 | Sakano | G06T 7/80 |
| 2018/0040141 A1* | 2/2018 | Guerreiro | G06V 20/56 |

(Continued)

*Primary Examiner* — Brian P Yenke
(74) *Attorney, Agent, or Firm* — Lempia Summerfield Katz LLC

(57) ABSTRACT

A vehicle includes a controller and a first camera, a second camera, and a third camera. The first camera is installed in the vehicle to have a first field of view and is configured to obtain first image data for the first field of view. The second camera is installed in the vehicle to have a second field of view and is configured to obtain second image data for the second field of view. The third camera is installed in the vehicle to have a third field of view and is configured to obtain third image data for the third field of view. The controller is configured to perform vehicle dynamic compensation (VDC) based on a result of processing any one of the first image data, the second image data, and the third image data and to perform automated online calibration (AOC) based on a result of the VDC to determine abnormality of the cameras.

18 Claims, 13 Drawing Sheets

(56) References Cited

U.S. PATENT DOCUMENTS

| | | | |
|---|---|---|---|
| 2018/0150976 A1* | 5/2018 | Loy | G06V 10/764 |
| 2018/0357791 A1* | 12/2018 | Dworakowski | G06T 7/74 |
| 2018/0365859 A1* | 12/2018 | Oba | B60W 40/114 |
| 2019/0118712 A1* | 4/2019 | Shigemura | H04N 7/18 |
| 2019/0164310 A1* | 5/2019 | Noble | G06T 7/74 |
| 2019/0206084 A1* | 7/2019 | Noble | G06T 7/73 |
| 2020/0005489 A1* | 1/2020 | Kroeger | G06T 7/85 |
| 2021/0001776 A1* | 1/2021 | Kim | B60R 1/002 |
| 2021/0248392 A1* | 8/2021 | Zaheer | G06V 10/764 |
| 2021/0343044 A1* | 11/2021 | Lee | G06T 7/80 |
| 2021/0387637 A1* | 12/2021 | Rogers | G01B 11/2755 |
| 2022/0042813 A1* | 2/2022 | Ko | G01C 21/3602 |
| 2022/0114815 A1* | 4/2022 | Ko | G06V 10/25 |
| 2022/0342054 A1* | 10/2022 | Katou | G01S 7/4026 |
| 2023/0032613 A1* | 2/2023 | Duan | G06T 3/4038 |
| 2023/0086983 A1* | 3/2023 | Won | G06T 7/55 |
| | | | 348/47 |
| 2023/0410528 A1* | 12/2023 | Weston | B60G 17/0182 |
| 2024/0020868 A1* | 1/2024 | Lee | G06V 20/56 |
| 2024/0062420 A1* | 2/2024 | Kakita | G06T 7/70 |
| 2024/0083415 A1* | 3/2024 | Lee | G06T 7/248 |
| 2024/0103525 A1* | 3/2024 | Lee | G06T 7/60 |
| 2024/0331199 A1* | 10/2024 | Laroia | H04N 13/246 |
| 2024/0386598 A1* | 11/2024 | Hayakawa | G06T 7/70 |
| 2025/0029279 A1* | 1/2025 | Lee | G06T 7/13 |

* cited by examiner $d = h \cdot \tan(90 - \theta)$ $d + \varDelta d = (h \pm \varDelta h) \cdot \tan(90 - (\theta + \varDelta \theta))$

ERROR

VEHICLE AND METHOD OF CONTROLLING THE SAME

CROSS-REFERENCE TO RELATED APPLICATION(S)

This application claims the benefit of priority to Korean Patent Application No. 10-2022-0057967, filed on May 11, 2022, in the Korean Intellectual Property Office, the disclosure of which is incorporated herein by reference.

TECHNICAL FIELD

The present disclosure relates to a vehicle and a method of controlling the same, and more particularly to a vehicle with multiple cameras and a method of controlling the same.

BACKGROUND

A vehicle with an autonomous driving system or advanced driver assistance system (ADAS) is necessarily provided with a camera and obtains information related to an object by recognizing the object through the camera.

The camera mounted to the vehicle may be changed in a criterion for recognizing an object due to topographic features and an external force. Therefore an error may occur between an actual distance and a measured distance based on image processing.

The vehicle may perform automated online calibration (AOC) to compensate for an error in a camera image due to the external force and may perform vehicle dynamic compensation (VDC) to compensate for an error in a camera image due to the topographic features.

Meanwhile, the vehicle uses visual odometry (VO) to perform the AOC and the VDC, but the VO has a disadvantage of requiring a very large amount of computation.

SUMMARY

An aspect of the disclosure is to compensate for an error in distance measurement due to a change in a posture of a vehicle and/or external force applied to a camera.

Additional aspects of the disclosure are set forth in part in the description which follows and, in part, should be apparent from the description, or may be learned by practice of the disclosure.

In accordance with an embodiment of the disclosure, a vehicle is equipped with a controller and multiple cameras including a first camera, a second camera, and a third camera. The first camera is installed in the vehicle to have a first field of view and is configured to obtain first image data for the first field of view. The second camera is installed in the vehicle to have a second field of view and is configured to obtain second image data for the second field of view. The third camera is installed in the vehicle to have a third field of view and is configured to obtain third image data for the third field of view. The controller is configured to perform vehicle dynamic compensation (VDC) based on a result of processing any one of the first image data, the second image data, and the third image data and to perform automated online calibration (AOC) based on a result of the VDC to determine abnormality of the multi-cameras.

The first camera may include either a front camera or a rear camera, the second camera may include either two frontward lateral cameras or two rearward lateral cameras, and the third camera may include an around view camera.

In accordance with an embodiment, the vehicle may further include an inertial measurement unit (IMU) configured to output a frequency that varies depending on a posture of a vehicle and to transmit the frequency to the controller. The controller is further configured to perform the VDC according to a change in the posture of the vehicle based on the magnitude of the frequency.

The controller may detect at least one of a road mark and a lane based on at least one of the first image data, the second image data, and the third image data, upon the magnitude of the frequency being lower than a predetermined value. The controller may store the road mark and the lane as a ground truth (GT) that is a criterion for determining the change in the posture of the vehicle.

The controller may detect at least one of the road mark and the lane based on at least one of the first image data, the second image data, and the third image data and may compare the stored GT with at least one of the road mark and the lane to perform the VDC, upon the magnitude of the frequency being greater than or equal to a predetermined value.

The controller may perform the AOC due to an external force applied to the camera by comparison based on epipolar geometry (EG) among the first camera, the second camera, and the third camera.

The controller may perform the AOC without performing the VDC, upon an external force being applied to any one of the first camera, the second camera, and the third camera.

The controller may determine whether the VDC is necessary for each of the first camera, the second camera, and the third camera, upon an external force being applied to at least two among the first camera, the second camera, and the third camera and may perform the AOC based on a result of the determination.

The controller may realign links among the first camera, the second camera, and the third camera, upon performing the AOC.

The controller may measure a distance from an object again based on the results of performing the VDC and the AOC.

In accordance with an embodiment of the disclosure, a method of controlling a vehicle with multiple cameras including a first camera, a second camera, and a third camera includes: performing VDC based on a result of processing any one of first image data of the first camera, second image data of the second camera, and third image data of the third camera; and performing AOC based on a result of the VDC to determine abnormality of the multi-cameras.

The first camera may include either a front camera or a rear camera. The second camera may include either two frontward lateral cameras or two rearward lateral cameras. The third camera may include an around view camera.

In accordance with an embodiment, the method may further include outputting a frequency that varies depending on a posture of a vehicle and transmitting the frequency to the controller. The may also include performing the VDC according to a change in the posture of the vehicle based on the magnitude of the frequency.

In accordance with an embodiment, the method may further include detecting at least one of a road mark and a lane based on at least one of the first image data, the second image data, and the third image data, upon the magnitude of the frequency being lower than a predetermined value. The method may also include storing the road mark and the lane as a GT that is a criterion for determining the change in the posture of the vehicle.

In accordance with an embodiment, the method may further include detecting at least one of the road mark and the lane based on at least one of the first image data, the second image data, and the third image data and may include comparing the stored GT with at least one of the road mark and the lane to perform the VDC, upon the magnitude of the frequency being greater than or equal to a predetermined value.

In accordance with an embodiment, the method may further include performing the AOC due to an external force applied to the camera by comparison based on EG among the first camera, the second camera, and the third camera.

In accordance with an embodiment, the method may further include performing the AOC without performing the VDC, upon an external force being applied to any one of the first camera, the second camera, and the third camera.

In accordance with an embodiment, the method may further include determining whether the VDC is necessary for each of the first camera, the second camera, and the third camera, upon an external force being applied to at least two among the first camera, the second camera, and the third camera. The method may also include performing the AOC based on a result of the determination.

In accordance with an embodiment, the method may further include realigning links among the first camera, the second camera, and the third camera, upon performing the AOC.

In accordance with an embodiment, the method may further include measuring a distance from an object again based on the results of performing the VDC and the AOC.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
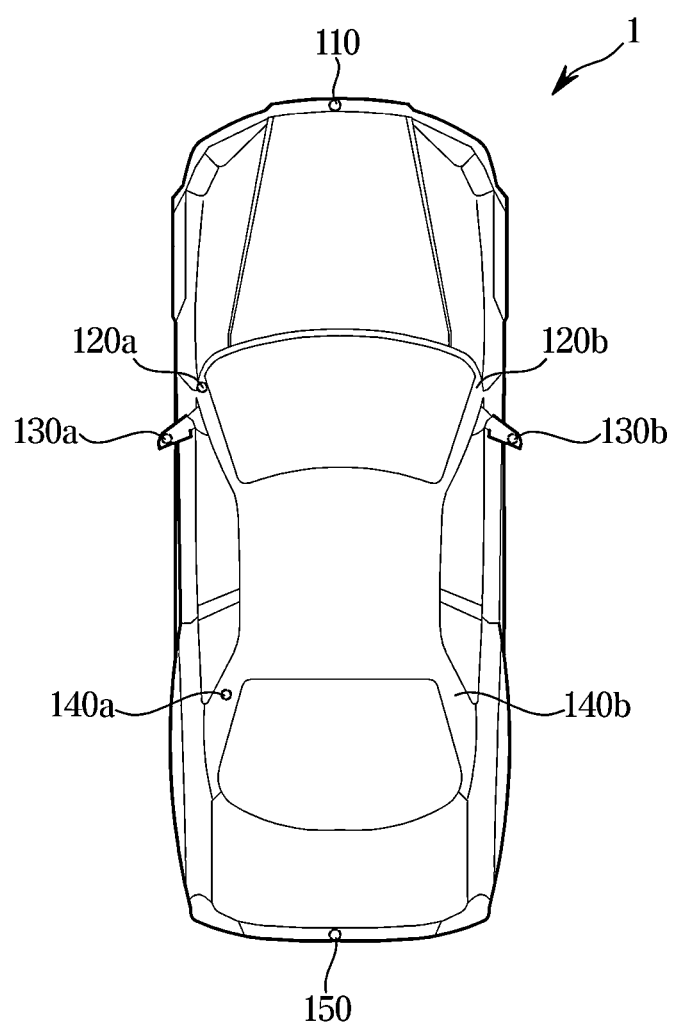
FIG. 1 illustrates a plurality of cameras arranged in a vehicle according to an embodiment.

Reference is made in detail to the embodiments of the disclosure, examples of which are illustrated in the accompanying drawings, wherein like reference numerals refer to like elements throughout. This specification does not describe all elements of the disclosed embodiments. Detailed descriptions of what is well known in the art or redundant descriptions on substantially the same configurations have been omitted. The terms "part," "module," "member," "block," and the like, as used in the specification may be implemented in software or hardware. Further, a plurality of "part," "module," "member," "block," and the like, may be embodied as one component. It is also possible that one "part," "module," "member," "block," and the like, includes a plurality of components.

Throughout the specification, when an element is referred to as being "connected to" another element, the element may be directly or indirectly connected to the other element. Use of "indirectly connected to" includes being connected to the other element via a wireless communication network.

Also, it is to be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms "first," "second," and the like, are used to distinguish one component from another component. The components are not limited by the terms described above.

An expression used in the singular encompasses the expression of the plural unless it has a clearly different meaning in the context.

The reference numerals used in operations are used for descriptive convenience and are not intended to describe the order of operations and the operations may be performed in a different order unless otherwise stated.

Hereinafter, working principles and embodiments of the disclosure will be described in detail with reference to the accompanying drawings. When a component, device, element, or the like of the present disclosure is described as having a purpose or performing an operation, function, or the like, the component, device, or element should be considered herein as being "configured to" meet that purpose or to perform that operation or function.

Figure 2:
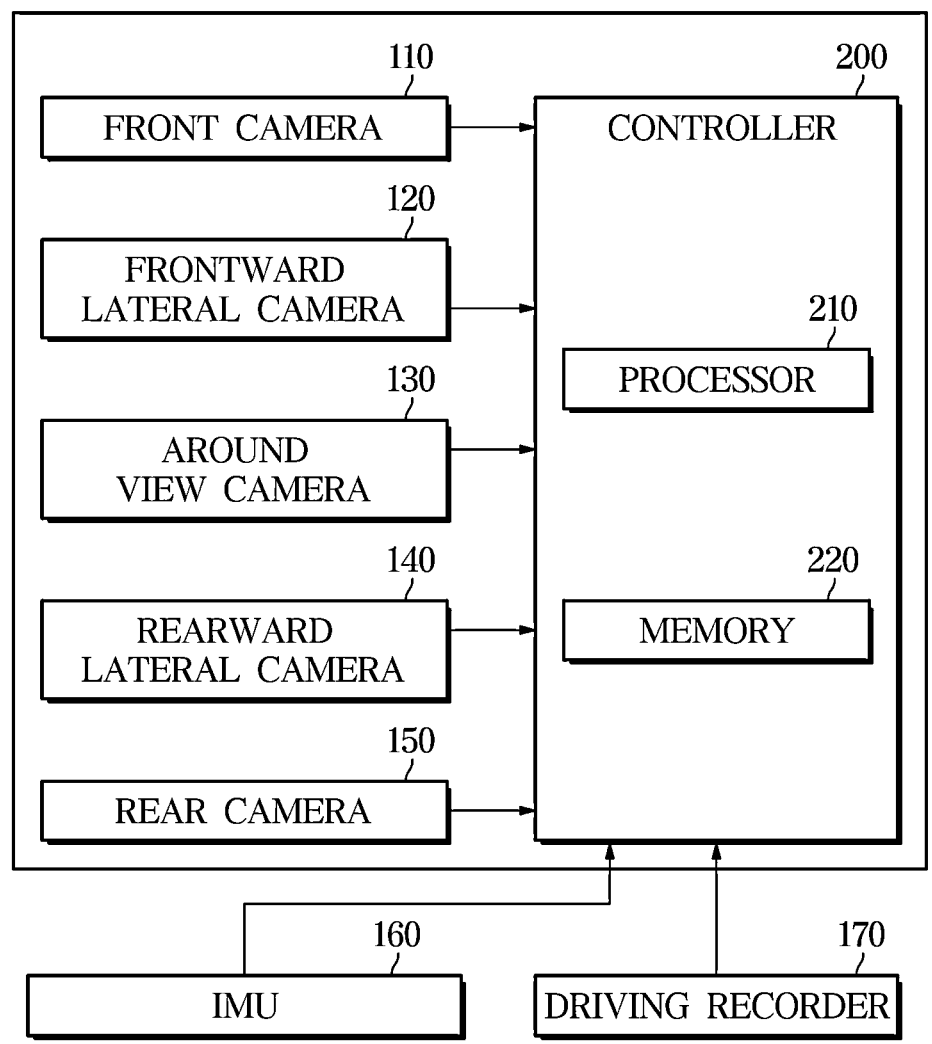
FIG. 2 is a control block diagram of a vehicle according to an embodiment.

FIG. 1 illustrates a plurality of cameras arranged in or on a vehicle according to an embodiment. FIG. 2 is a control block diagram of a vehicle according to an embodiment.

A vehicle 1 may assist a driver in controlling (e.g., drive, brake, and steer) the vehicle 1. For example, the vehicle 1 may detect surrounding environments (e.g., other vehicles, pedestrians, cyclists, lanes, road signs, and the like) and may control the driving and/or the braking and/or the steering of the vehicle 1 in response to the detected environments. Below, an object includes other vehicles, cyclists, and the like, in the surrounding environment, which may collide with the traveling vehicle 1.

The vehicle 1 may offer various functions to a driver. For example, the vehicle 1 may provide lane departure warning (LDW), lane keeping assist (LKA), high beam assist (HBA), autonomous emergency braking (AEB), traffic sign recognition (TSR), smart cruise control (SCC), blind spot detection (BSD), and the like, to implement an advanced driver assistance system (ADAS) or an autonomous driving system.

To provide various functions described above, the vehicle 1 may include cameras at various positions thereof as shown in FIG. 1. Although it is not shown in FIG. 1, the vehicle 1 may include radio detection and ranging (RADAR) and light detection and ranging (LIDAR) in addition to the cameras to perform the foregoing functions.

The vehicle 1 may include a front camera 110, frontward lateral cameras 120 (120a, 120b), one or more around view cameras 130 (130a, 130b), rearward lateral cameras 140 (140a, 140b), and a rear camera 150, thereby implementing a plurality of cameras or multiple cameras, which may be referred to herein as multi-cameras.

The front camera 110 may be installed in the front windshield of the vehicle 1 to secure a field of view facing toward the front. The front camera 110 may capture the front of the vehicle 1 and obtain image data about the front of the vehicle 1. The front camera 110 may detect an object moving in a front field of view or detect an object traveling in an adjacent lane in a front side field of view. The image data about the front of the vehicle 1 may include location information about at least one of other vehicles, pedestrians, cyclists, lanes, curbstones, guardrails, street trees, and/or streetlights located in front of the vehicle 1.

The frontward lateral cameras 120 (120a, 120b) may be installed in or on the frontward sides of the vehicle 1, such as an A pillar and a B pillar of the vehicle 1, to secure a field of view facing toward the frontward sides. The frontward lateral cameras 120 may capture the frontward sides of the vehicle 1 and obtain image data about the frontward sides of the vehicle 1.

The around view cameras 130 (130a, 130b) may be installed in or on the side-view mirrors of the vehicle 1 to secure a field of view facing toward the downward sides of the vehicle 1. The around view cameras 130 may capture the downward sides of the vehicle 1 and obtain image data about the downward sides of the vehicle 1.

The rearward lateral cameras 140 (140a, 140b) may be installed in or on the rearward sides of the vehicle 1, such as a C pillar of the vehicle 1, to secure a field of view facing toward the rearward sides of the vehicle 1. The rearward lateral cameras 140 may capture the rearward sides of the vehicle 1 and obtain image data about the rearward sides of the vehicle 1.

The rear camera 150 may be installed in or on the rear side of the vehicle 1, such as a rear bumper, to secure a field of view facing toward the rear of the vehicle 1. The rear camera 150 may capture the rear of the vehicle 1 and obtain image data about the rear of the vehicle 1.

Below, for convenience of description, at least two among the front camera 110, the frontward lateral cameras 120 (120a, 120b), the around view cameras 130 (130a, 130b), the rearward lateral cameras 140 (140a, 140b), and the rear camera 150 will be called the multi-cameras. FIG. 1 shows a multi-camera system with eight cameras, but the multi-camera system may include four to eight cameras or more than eight cameras.

A controller 200 may acquire a plurality of camera images captured by the multi-cameras, and may generate a three-dimensional image based on a geometric relationship between the plurality of camera images. In this case, the controller 200 may obtain more physical information about an object from the plurality of camera images than from a camera image captured by a single camera.

The controller 200 may include an image signal processor, i.e., a processor 210 for processing the image data of the multi-cameras, and/or a micro control unit (MCU) for generating a braking signal, or the like.

While the ADAS is performed, the controller 200 may identify objects in an image based on image information obtained by the front camera 110 and may compare information about the identified objects with object information stored in a memory 220, thereby determining whether the objects in the image are stationary obstacles or moving obstacles.

The memory 220 may be configured to store programs and/or data for processing the image data, programs and/or data for processing radar data, and programs and/or data for allowing the processor 210 to generate a braking signal and/or a warning signal.

The memory 220 may be configured to temporarily store the image data received from the multi-cameras, and to temporarily store the results of processing the image data and/or the radar data of the memory 220.

The memory 220 may be implemented as, but not limited to, at least one nonvolatile memory device such as a cache, a read-only memory (ROM), a programmable ROM (PROM), an erasable programmable ROM (EPROM), an electrically erasable programmable ROM (EEPROM), and a flash memory. The memory 220 may also be implemented as, but not limited to, at least one volatile memory device such as a random access memory (RAM), or storage media such as a hard disk drive (HDD), and a compact disk ROM (CD-ROM).

An inertial measurement unit (IMU) 160 may measure a frequency with a combination of a 3-axial accelerometer and a 3-axial gyro sensor. The IMU 160 may determine the angles of roll, pitch, and yaw based on the measured frequency, thereby determining the posture of the vehicle 1. Therefore, the vehicle 1 may determine the inclination, height, and the like, of the vehicle 1 according to the topographic features based on the frequency output from the IMU 160.

The controller 200 may receive information about the frequency that varies in magnitude depending on the posture of the vehicle 1 from the IMU 160 and may detect a change in the posture of the vehicle 1 based on the magnitude of the frequency.

A driving recorder 170 refers to a device that obtains and provides the driving conditions or the like of the vehicle 1 to the controller 200. To this end, the driving recorder 170 records the movement amount, speed, revolutions per minute (RPM), and brake force of the vehicle 1, and the location, azimuth, acceleration, travel distance, and the like, based on a global positioning system (GPS) in an electronic device.

The controller 200 may receive the movement amount of the vehicle 1 from the driving recorder 170 and may obtain a region of interest (ROI) of a feature point in visual odometry (VO).

The foregoing configuration is to accurately obtain the location information of an object based on a relationship between the vehicle 1 and the object through the multi-cameras of the vehicle 1. However, the posture of the vehicle 1 may be varied depending on the topographic features. Also, the multi-cameras mounted to the vehicle 1 may be changed in an installation angle or the like due to external impacts. Detailed examples are described with reference to FIGS. 3 and 4.

Figure 3:
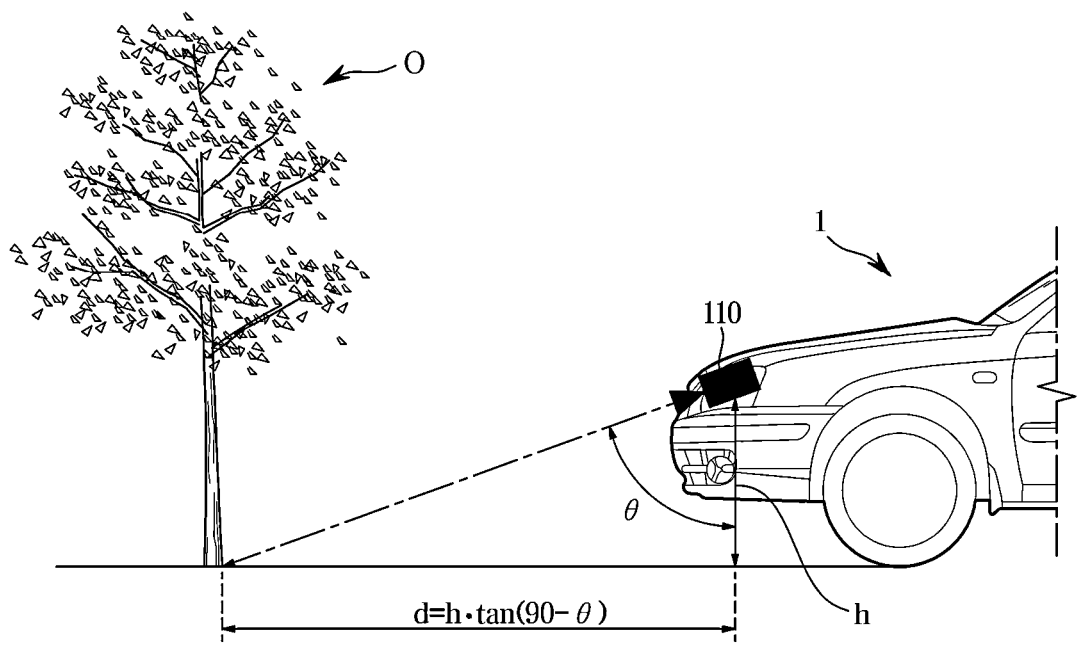
FIGS. 3 and 4 are views for explaining that an error occurs due to a change in a posture of a vehicle.
Figure 4:
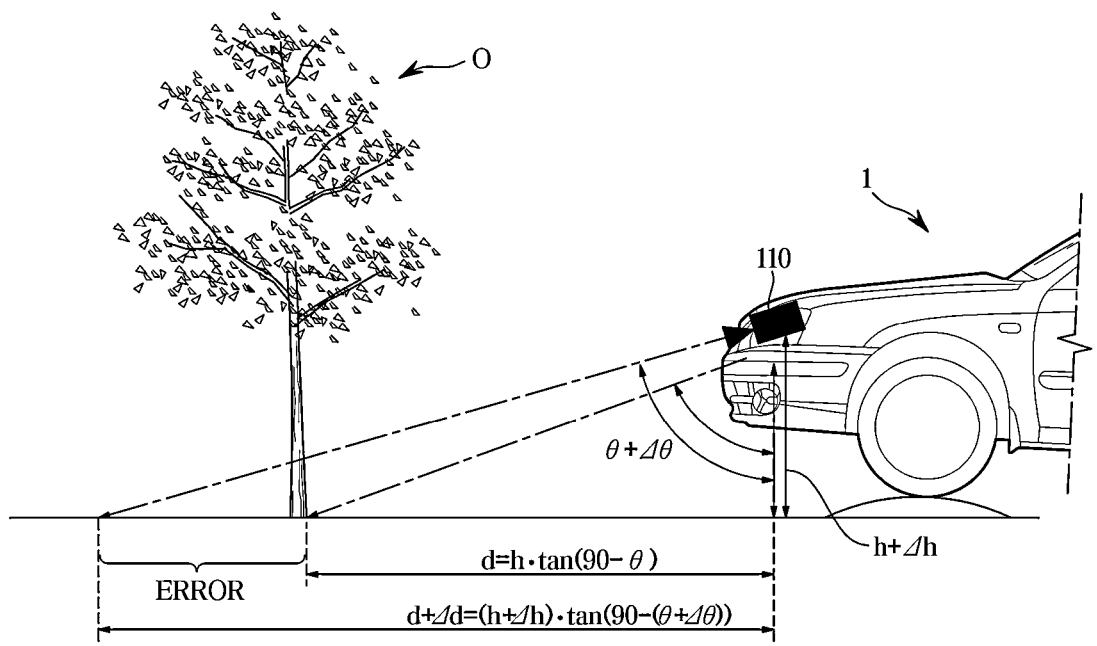

FIGS. 3 and 4 are views for explaining that an error occurs due to a change in the posture of a vehicle;

The multi-cameras recognize an object O in a camera image. The controller 200 processes image data to calculate a distance from the object O. Referring to FIG. 3, the controller 200 needs information about the posture/position h of the front camera 110 with respect to a road surface in order to calculate a horizontal distance d between the vehicle 1 and the object O.

When the posture of the vehicle 1 is changed due to topographic factors as shown in FIG. 4, the posture of the front camera 110 mounted to the vehicle 1 is also changed, and thus an error occurs in the calculated horizontal distance d between the vehicle 1 and the object O. In this case, there are no changes in the relationship between the front camera 110 and the vehicle 1.

Although the road surface is even unlike the case of FIG. 4, an external impact or the like may change the mounting posture (or position) of the front camera 110, and thus cause an error.

To correct an error in distance measurement due to an external factor, the controller 200 may perform at least two processes.

First, to solve a measurement error due to the change in posture of the vehicle 1, the controller 200 may estimate the changed posture of the vehicle 1 based on a road mark and/or lane, or may perform vehicle dynamic compensation (VDC) that estimates the changed posture by comparing the feature points of the successive camera images in the VO.

Second, to solve a measurement error due to the changed posture of the camera as an external impact is applied to one or more of the multi-cameras, the controller 200 may perform automated online calibration (AOC) that estimates the changed posture of the camera based on epipolar geometry (EG) between the multi-cameras.

According to an embodiment, the controller 200 may perform the AOC for the external force applied to the camera based on a comparison in the EG between the multi-cameras.

The EG refers to a logic that aligns two or more images in parallel with a capturing direction and plays a very important role in photogrammetry and computer vision for extracting various pieces of information manually and automatically using a three-dimensional image. Further, in the case of performing automatic matching in numerical photogrammetry, the EG minimizes a search region, thereby improving the efficiency and accuracy of the matching.

The VO using the EG refers to a technique for estimating the amount of motion (movement or rotation) of an object based on image processing. The VDC and the AOC may use the VO to estimate the changed positions and/or changed postures of the multi-cameras.

Meanwhile, the VO for the VDC and AOC needs to be performed as many times as the number of multi-cameras. Because the VO requires a very large amount of computation, it is difficult to process all the image data from the multi-cameras through a single processor. Further, the VDC or AOC may be performed even under normal conditions, thereby lowering the accuracy of distance measurement.

As described above, a problem with the amount of computation arises when the VO for the VDC and AOC is performed with respect to all the cameras at a time. According to the disclosure, regions are assigned to the multi-cameras, and the postures and positions of the multi-cameras are estimated by a separate logic.

Figure 5:
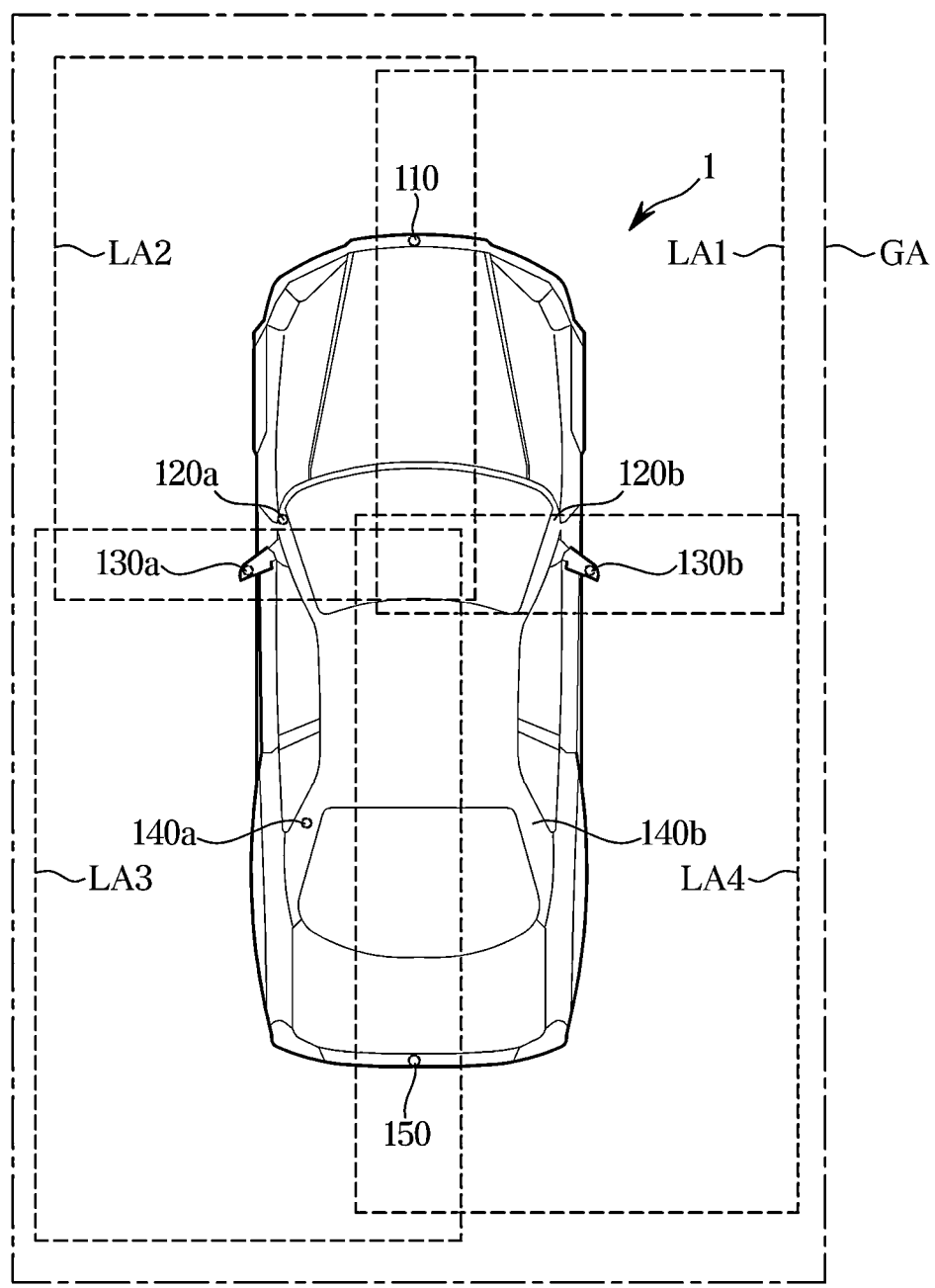
FIG. 5 illustrates a first region and a second region as compensation criteria for a plurality of cameras.
Figure 6:
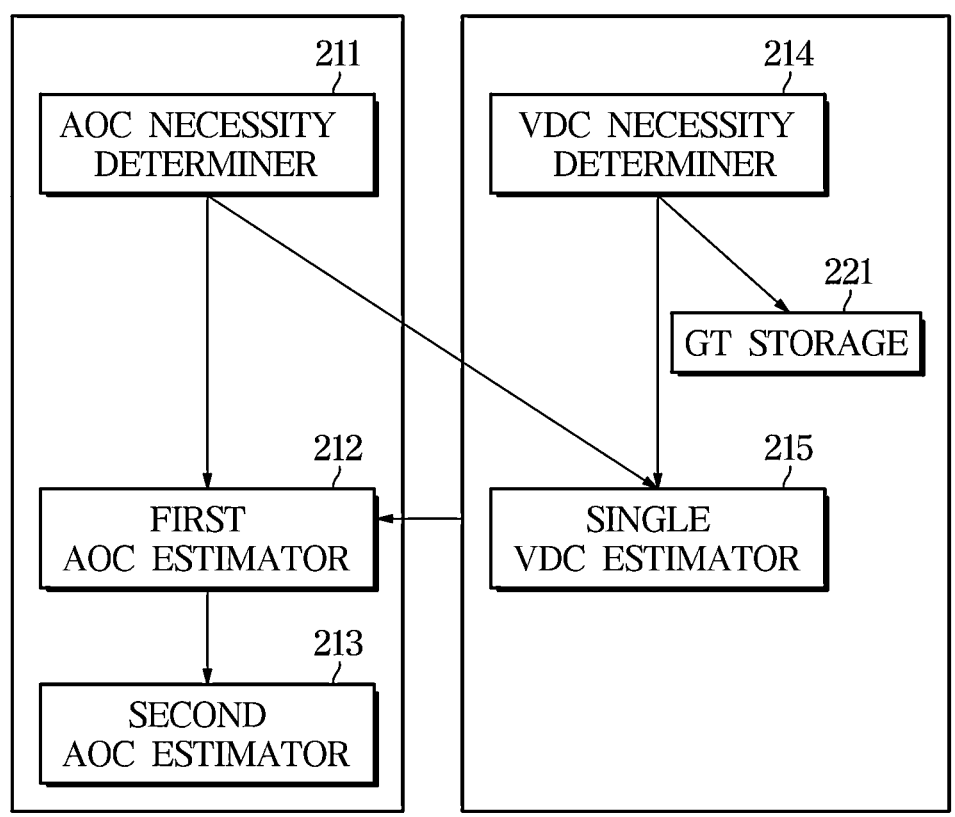
FIG. 6 is a functional block diagram of a controller according to an embodiment.
Figure 7:
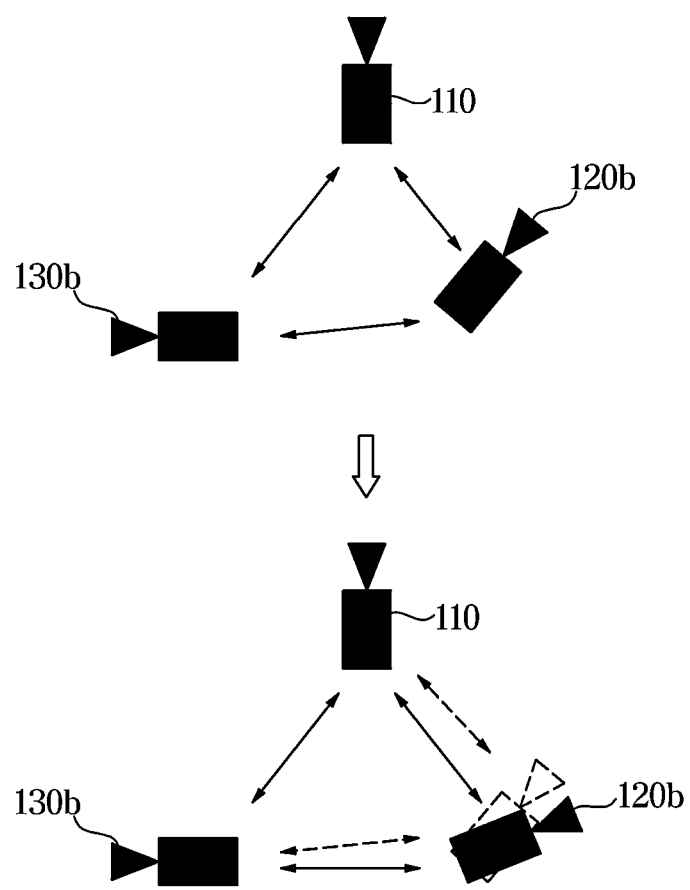
FIG. 7 illustrates a change in a single camera in a first region.
Figure 8:
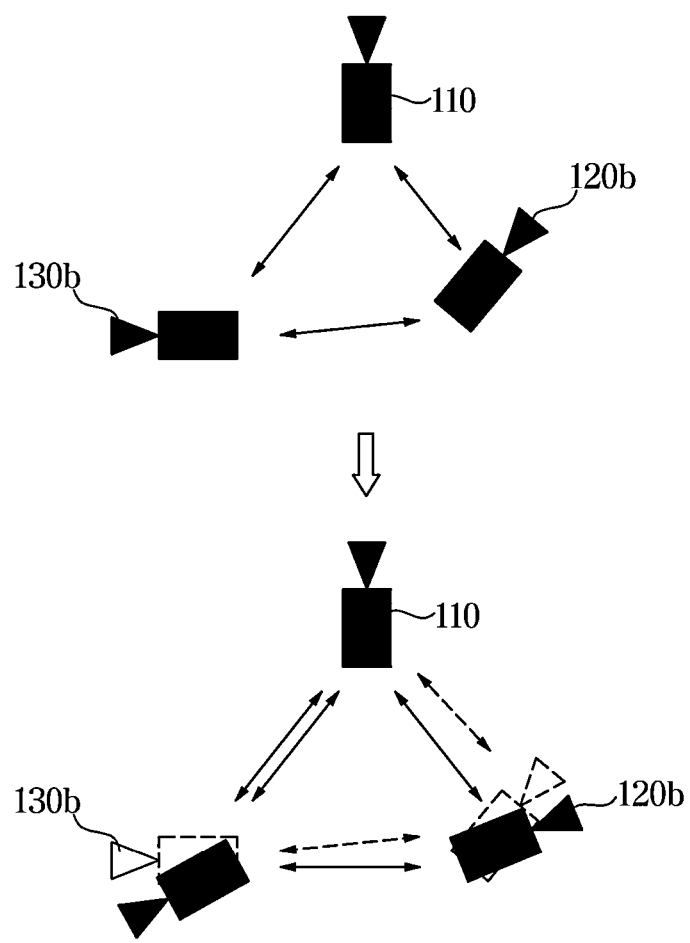
FIG. 8 illustrates a change in a plurality of cameras in a first region.

FIG. 5 illustrates a first region and a second region as compensation criteria for a plurality of cameras. FIG. 6 is a functional block diagram of a controller according to an embodiment. FIG. 7 illustrates a change in a single camera in a first region and FIG. 8 illustrates a change in a plurality of cameras in a first region.

Referring to FIG. 5, first regions LA1, LA2, LA3, and LA4 provided in units of cameras, of which the fields of view are partially overlapped, and a second region GA covering all the cameras of the vehicle 1, may be defined as criteria for determining the necessity for the VDC and/or AOC.

The first regions LA1, LA2, LA3, and LA4 may involve: the front camera 110, a frontward right camera 120b, and a right around view camera 130b (LA1); the front camera 110, a frontward left camera 120a, and a left around view camera 130a (LA2); the left around view camera 130a, a rearward left camera 140a and the rear camera 150 (LA3); and a right around view camera 130b, a rearward right camera 140b and the rear camera 150.

The second region GA may involve all the cameras mounted to the vehicle 1.

The controller 200 may determine the necessity for the AOC and the necessity for the VDC and may use a result of the VDC to determine the necessity for the AOC.

Referring to FIG. 6, the controller 200 may include an AOC necessity determiner 211 to perform the AOC, a first AOC estimator 212, and a second AOC estimator 213 to perform the AOC. The controller 200 may also include a VDC necessity determiner 214, a ground truth (GT) storage 221, and a single VDC estimator 215 to perform the VDC.

The AOC necessity determiner 211 determines the necessity for the AOC. When an impact on the vehicle 1 is detected, the controller 200 may determine that the AOC is necessary. The AOC necessity determiner 211 may determine the necessity for the AOC for each first region with respect to a position where the impact occurs and may use the result of the single VDC when the AOC is necessary for two or more cameras.

The AOC refers to a method of estimating a degree of change when the posture or position of the camera is changed by an external force. Therefore, the AOC necessity determiner 211 determines whether the AOC is necessary by checking a change in the posture or position of the camera.

The AOC necessity determiner 211 estimates a geometrical relationship between the cameras in local units, i.e., the first regions LA1, LA2, LA3, and LA4, and determines that the AOC is necessary when the geometrical relationship is changed. In this case, the VO may be used. Because the fields of view of at least three cameras are overlapped in each first region, it is possible to estimate the geometrical relationship between the cameras based on information about the overlapped areas.

As shown in FIG. 7, when only the frontward right camera 120b is changed in posture within the first region LA1, and the geometrical relationship among the front camera 110, the frontward right camera 120b and the right around view camera 130b before and after the change is known, it is possible to determine which camera is changed in posture. In this case, the AOC is performed for the first region LA1.

As shown in FIG. 8, when the frontward right camera 120b and the right around view camera 130b are changed in posture within the first region LA1, it is impossible to determine which camera is changed in posture. In this case, the necessity for the single VDC is determined for each camera within the first region LA1, and the AOC is performed. When the VDC is not necessary for a certain camera, and a result of the VDC is generated, it is determined that the posture and position of the camera are changed by an external force and the AOC is necessary.

Advantageously, the determinations of FIGS. 7 and 8 are possible even while the vehicle 1 is traveling on an uneven road surface because the geometrical relationship between the camera is invariable even though the posture of the vehicle 1 is changed.

The first AOC estimator 212 estimates the posture and position between the cameras in the local units, i.e., the first regions LA1, LA2, LA3, and LA4.

The second AOC estimator 213 estimates the postures and positions of all the cameras in the whole unit, i.e., the second region GA.

The VDC necessity determiner 214 determines the necessity for the VDC of each camera. It may be determined based on the frequency received from the IMU 160 (refer back to FIG. 2) whether the VDC is necessary. The VDC necessity determiner 214 may determine that the vehicle 1 is changed in posture when a high-frequency component is generated in the IMU 160 measures. Because the IMU 160 is used in determining whether the VDC is necessary, it is possible to determine the necessity of the VDC independently of the necessity of the AOC. When the VDC is not necessary, a currently captured image may be stored as the GT, i.e., the criterion for determining the change in the posture of the vehicle, in the GT storage 221.

The controller 200 according to an embodiment may detect at least one of the road mark and the lane when the magnitude of the frequency acquired from the IMU 160 is lower than a predetermined value, and store at least one of the road mark and the lane as the GT.

Further, the controller 200 according to an embodiment may perform the VDC by comparing the stored GT and at least one of the road mark and the lane when the magnitude of the frequency acquired from the IMU 160 is higher than or equal to a predetermined value.

The controller 200 according to an embodiment may perform the VDC based on a result of processing any one of the first image data, the second image data, and the third image data respectively acquired by the multi-cameras. In this case, the AOC may be performed based on the result of the VDC and it may be determined whether the multi-cameras are abnormal. The controller 200 determines an error in distance from an object due to a change in the posture of the vehicle 1 or an external force by performing link alignment between the multi-cameras, thereby obtaining an actual distance from the object.

Figure 9A:
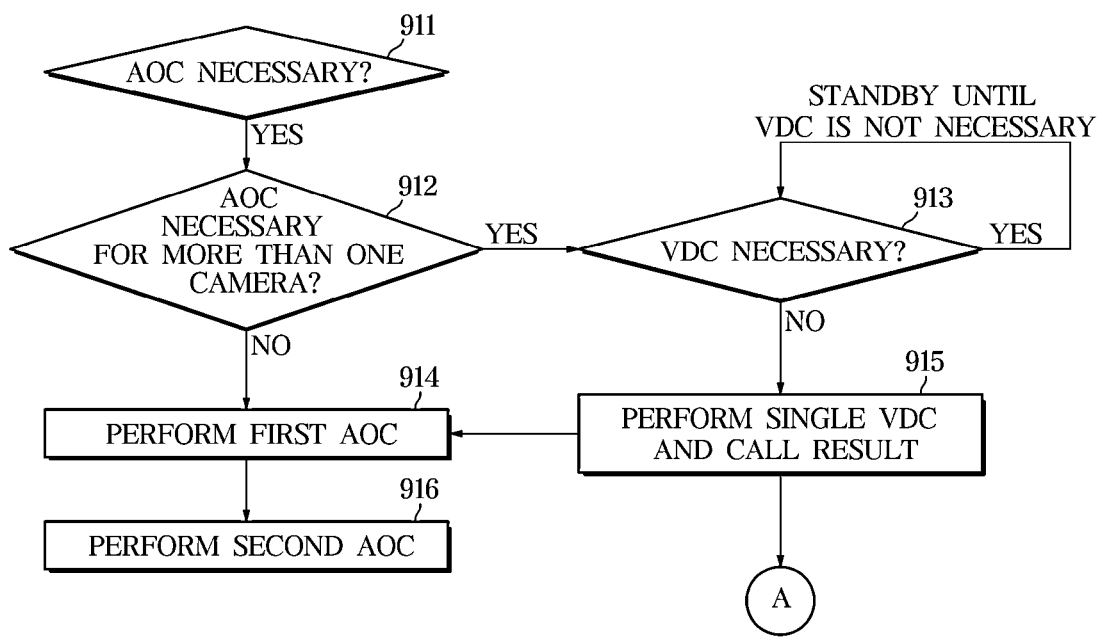
FIGS. 9A and 9B are flowcharts showing a control method of a vehicle according to an embodiment.
Figure 9B:
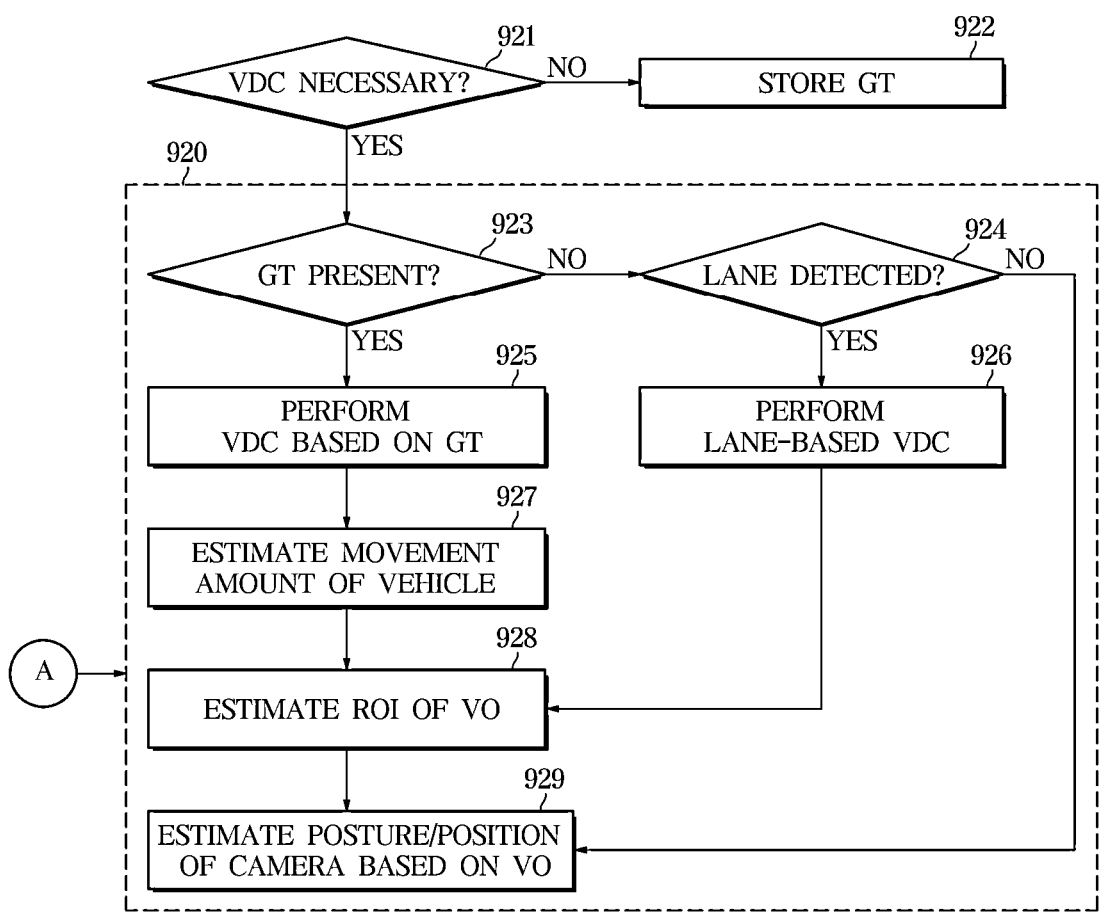

FIGS. 9A and 9B are flowcharts showing a control method of a vehicle according to an embodiment.

Referring to FIG. 9A, the controller 200 determines whether the AOC is necessary (911). The controller 200 may determine that the AOC is necessary when an impact on the vehicle 1 is detected.

When it is determined that only one camera is changed in posture within the first region (912), the controller 200 performs the first AOC (914) and performs the second AOC (916).

Specifically, when it is determined that one camera is changed in posture within the first region, the controller 200 performs the first AOC for determining a degree of change in the posture or position of the changed camera based on the information about the other two cameras. In other words, the geometrical relationship between the cameras is used to determine the change in the posture or position of the changed camera.

On the other hand, when more than one camera is changed in posture within the first region (912), the controller 200 determines the necessity for the VDC (913) before performing the first AOC (914) and the second AOC (916). The first AOC and the second AOC are performed (914, 916) by determining the necessity for the VDC (913), performing the single VDC, and calling the result of the VDC (915).

When the optimization for distance measurement is performed only in units of the first region, errors between different first regions may increase. Therefore, the controller 200 finally performs the second AOC in the whole unit, i.e., the second region.

Figure 10:
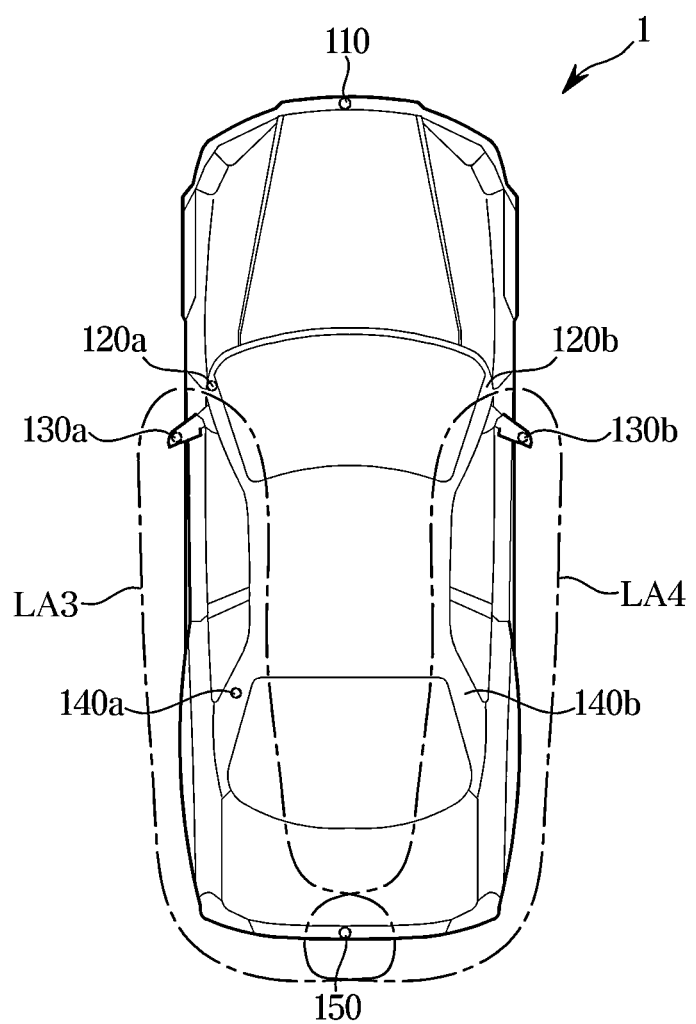
FIGS. 10 and 11 illustrate an example that an error occurs in first regions.
Figure 11:
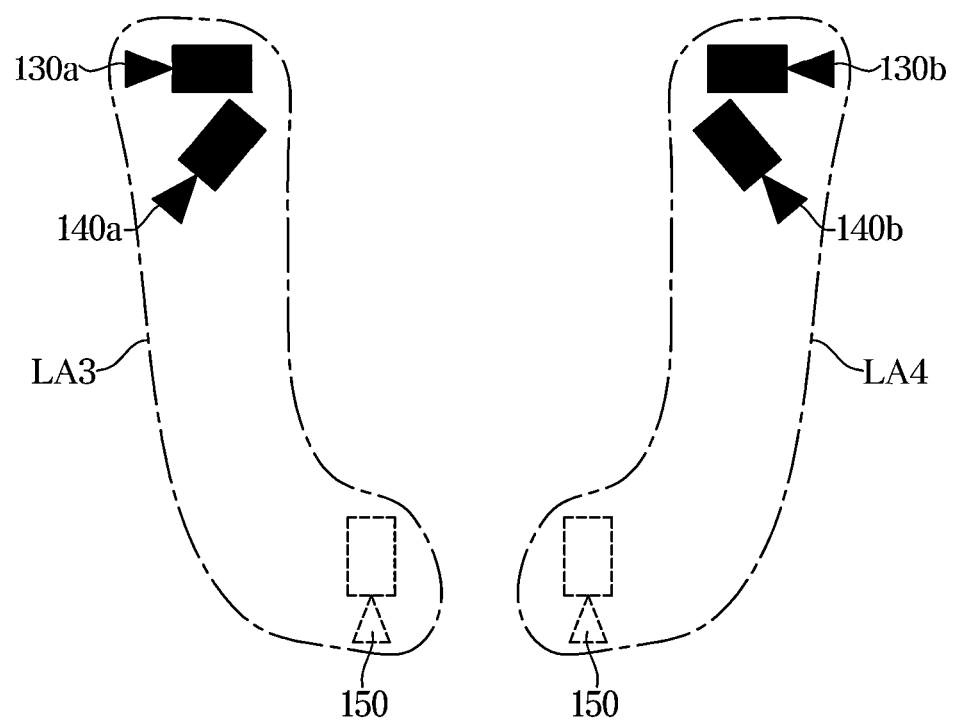
Figure 12:
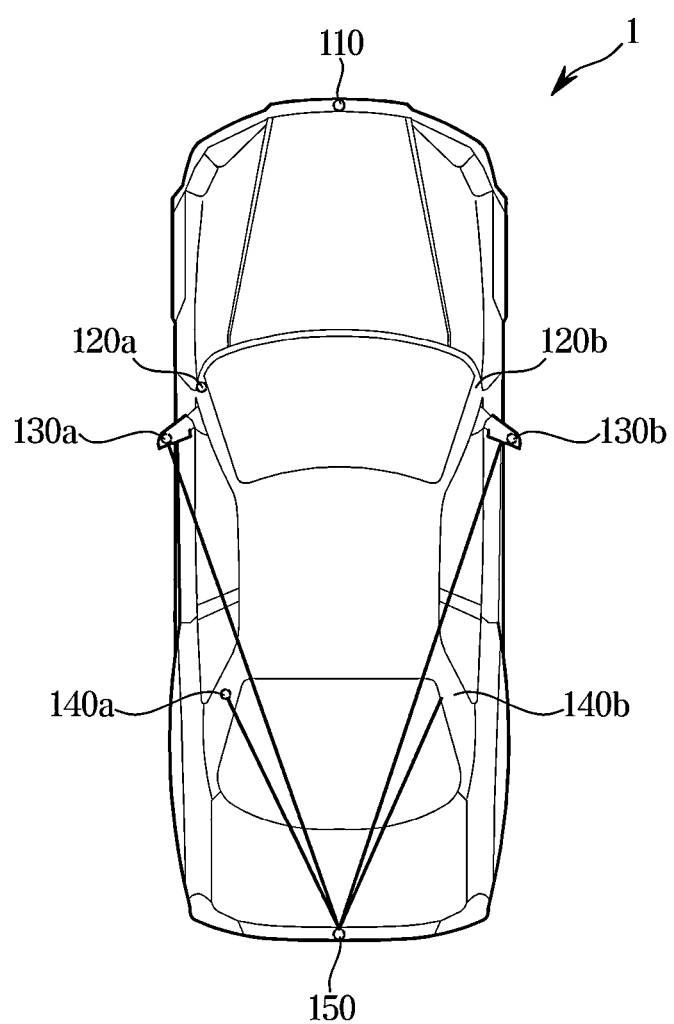
FIG. 12 illustrates a link process for solving the error occurrence.

Referring to FIGS. 10, 11, and 12, an error may occur between LA3 and LA4 among the first regions. For example, an error between the local areas, i.e., a geometrical distance (see FIG. 11) between the identical cameras (e.g., the rear camera 150 of FIG. 10) in different local areas, and there is a need for minimizing the error between the local areas. Although the rear camera 150 is located at the same position, a geometrical difference may occur after the AOC and/or VDC is performed in units of the first region.

Therefore, the controller 200 may perform the second AOC through the link alignment between the multi-cameras in units of the first region. Because all the cameras are mounted to the vehicle and thus relative positions between the cameras are invariable unless a significant impact such as an accident occurs, the second AOC may be performed with respect to the relative positions. The controller 200 performs the second AOC based on the positions between the cameras stored by offline camera calibration (OCC) before the vehicle is released.

Meanwhile, the vehicle 1 according to the disclosure uses the result of the single VDC when the AOC is necessary for two or more cameras due to an external impact. As described above with reference to FIG. 8, when two or more cameras are changed in posture within the first region, it is impossible to determine which camera is changed in posture. When a result of performing the single VDC for each camera is generated, it may be determined that the posture and position of the camera are changed due to an external force. In this case, the changed posture and position of the camera due to the VDC mean that the changed posture and position of the vehicle 1.

Referring to FIG. 9B, the controller 200 may identify the necessity for the VDC (921), and store the currently captured image as the GT, i.e., the criterion for determining the change in the posture of the vehicle, in the GT storage 221 when the VDC is not necessary (922).

The controller 200 may perform any one of two types of VDC according to whether or not the GT is present.

When the GT is present (923), the controller 200 performs the VDC based on the GT (925). The controller 200 may determine the changed posture and/or position of the vehicle 1 by estimating the geometrical relationship between the stored GT and the current image obtained by the camera.

The controller 200 estimates the movement amount of the vehicle 1 (927) and estimates the ROI of the VO (928). The VO refers to a method of estimating the changed posture and/or position (height) based on optical flow and calculates the movement amount of the feature point within the ROI. The feature point may employ feature points on the road mark.

The controller 200 may estimate the posture and/or position of the camera based on the VO (929). The controller 200 may predict the ROI, to which the feature points will move in an image next to the current image, by obtaining the movement amount of the vehicle 1 from the inertial measurement unit 160 and the driving recorder 170 based on the estimated posture and/or position of the camera. In this case, the controller 200 takes only the ROI into account, thereby decreasing the amount of computation due to the VO.

Meanwhile, the controller 200 may perform the VDC based on the lane. When the lane is detected in the image (924), the controller 200 performs the lane-based VDC (926). The controller 200 estimates only the changed posture on the assumption that there is little change in the height of the camera. In this case, a parallel straight line is used as the GT, and a geometrical relationship between the parallel straight line and the current image is estimated, thereby estimating the changed posture.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

According to an embodiment of the disclosure, when the posture of the vehicle is changed and when an external force is applied to the camera, the amount of computation due to the VO is minimized, and the AOC and VDC are prevented from malfunctioning.

Although embodiments of the disclosure are shown and described, it should be appreciated by those having ordinary skill in the art that changes may be made in these embodiments without departing from the principles and spirit of the disclosure, the scope of which is defined in the claims and their equivalents.

What is claimed is:

1. A vehicle with multiple cameras including a first camera, a second camera, and a third camera, the vehicle comprising:
   the first camera installed in or on the vehicle to have a first field of view and configured to obtain first image data for the first field of view;
   the second camera installed in or on the vehicle to have a second field of view and configured to obtain second image data for the second field of view;
   the third camera installed in or on the vehicle to have a third field of view and configured to obtain third image data for the third field of view; and
   a controller configured to
   perform vehicle dynamic compensation (VDC) based on a result of processing any one of the first image data, the second image data, and the third image data,
   perform automated online calibration (AOC) based on a result of the VDC to determine an abnormality of at least one of the first, second, or third camera
   determine whether the VDC is necessary for each of the first, second, and third cameras based on an external force being applied to any of the first, second, or third cameras,
   perform the AOC without performing the VDC in response to a detection of the external force, and
   determine the abnormality of at least one of the first, second, or third camera based on a result of the AOC.

2. The vehicle of claim 1, wherein
   the first camera comprises either a front camera or a rear camera,
   the second camera comprises either two frontward lateral cameras or two rearward lateral cameras, and
   the third camera comprises at least one around view camera.

3. The vehicle of claim 1, further comprising an inertial measurement unit (IMU) configured to
   output a frequency that varies depending on a posture of the vehicle, and
   transmit the frequency to the controller,
   wherein the controller is further configured to perform the VDC according to a change in the posture of the vehicle based on a magnitude of the frequency.

4. The vehicle of claim 3, wherein the controller is further configured to
   detect at least one of a road mark and a lane based on at least one of the first image data, the second image data, and the third image data, upon the magnitude of the frequency being lower than a predetermined value, and
   store the road mark and the lane as a ground truth (GT) that is a criterion for determining the change in the posture of the vehicle.

5. The vehicle of claim 4, wherein the controller is further configured to
   detect at least one of the road mark and the lane based on at least one of the first image data, the second image data, and the third image data, and
   compare the stored GT with at least one of the road mark and the lane to perform the VDC, upon the magnitude of the frequency being greater than or equal to a predetermined value.

6. The vehicle of claim 1, wherein the controller is further configured to perform the AOC due to the external force applied to any one of the first camera, the second camera, or the third camera by comparison based on epipolar geometry (EG).

7. The vehicle of claim 6, wherein the controller is further configured to
   determine whether the VDC is necessary for each of the first camera, the second camera, and the third camera, upon an external force being applied to at least two among the first camera, the second camera, and the third camera, and
   perform the AOC based on a result of the determination.

8. The vehicle of claim 7, wherein the controller is further configured to realign links among the first camera, the second camera, and the third camera, upon performing the AOC.

9. The vehicle of claim 1, wherein the controller is further configured to measure a distance from an object again based on results of performing the VDC and the AOC.

10. A method of controlling a vehicle with multiple cameras including a first camera, a second camera, and a third camera, the method comprising:
    performing vehicle dynamic compensation (VDC) based on a result of processing any one of first image data of the first camera, second image data of the second camera, or third image data of the third camera;
    performing automated online calibration (AOC) based on a result of the VDC to determine an abnormality of the multiple cameras;
    determining whether the VDC is necessary for each of the first, second, and third cameras based on an external force being applied any one of the first camera, the second camera, or the third camera;
    selectively performing the AOC without performing the VDC in response to detection of the external force; and
    determining the abnormality of the multiple cameras based on a result of the AOC.

11. The method of claim 10, wherein
    the first camera comprises either a front camera or a rear camera,
    the second camera comprises either two frontward lateral cameras or two rearward lateral cameras, and
    the third camera comprises at least one around view camera.

12. The method of claim 10, further comprising:
    outputting a frequency that varies depending on a posture of the vehicle;

transmitting the frequency to a controller; and
performing the VDC according to a change in the posture of the vehicle based on a magnitude of the frequency.

13. The method of claim 12, further comprising
detecting at least one of a road mark and a lane based on at least one of the first image data, the second image data, and the third image data, upon the magnitude of the frequency being lower than a predetermined value, and
storing the road mark and the lane as a ground truth (GT) that is a criterion for determining the change in the posture of the vehicle.

14. The method of claim 13, further comprising
detecting at least one of the road mark and the lane based on at least one of the first image data, the second image data, and the third image data, and
comparing the stored GT with at least one of the road mark and the lane to perform the VDC, upon the magnitude of the frequency being greater than or equal to a predetermined value.

15. The method of claim 10, further comprising performing the AOC due to the external force applied to any one of the first camera, the second camera, or the third camera by comparison based on epipolar geometry (EG).

16. The method of claim 15, further comprising determining whether the VDC is necessary for each of the first camera, the second camera, and the third camera, upon an external force being applied to at least two among the first camera, the second camera, and the third camera, and performing the AOC based on a result of the determination.

17. The method of claim 16, further comprising realigning links among the first camera, the second camera, and the third camera, upon performing the AOC.

18. The method of claim 10, further comprising measuring a distance from an object again based on results of performing the VDC and the AOC.

* * * * *